US012770430B2

(12) United States Patent
Vitzrabin et al.

(10) Patent No.: US 12,770,430 B2
(45) Date of Patent: Oct. 20, 2026

(54) DYNAMIC TARGET DETECTION AND TRACKING

(71) Applicant: REALSENSE, INC., Santa Clara, CA (US)

(72) Inventors: Efraim Vitzrabin, Kiryat Uno (IL); Dan Horovitz, Rishon Lezion (IL); Igal Gurevich, Moshav Emunim (IL)

(73) Assignee: REALSENSE, INC.

( * ) Notice: Subject to any disclaimer, the term of this patent is extended or adjusted under 35 U.S.C. 154(b) by 226 days.

(21) Appl. No.: 18/398,275

(22) Filed: Dec. 28, 2023

(65) Prior Publication Data

US 2025/0218215 A1 Jul. 3, 2025

(51) Int. Cl.
*G06V 40/16* (2022.01)
*G06V 40/20* (2022.01)

(52) U.S. Cl.
CPC ............ *G06V 40/172* (2022.01); *G06V 40/25* (2022.01)

(58) Field of Classification Search
CPC ............................. G06V 40/172; G06V 40/25
See application file for complete search history.

(56) References Cited

U.S. PATENT DOCUMENTS

| | | | | |
|---|---|---|---|---|
| 11,200,787 | B2 * | 12/2021 | Shionozaki | G05D 1/0214 |
| 2016/0188977 | A1 * | 6/2016 | Kearns | B25J 11/002 348/113 |
| 2021/0046655 | A1 * | 2/2021 | Deyle | B25J 9/1664 |

OTHER PUBLICATIONS

Dudek et al.: "Task harmonisation for a single-task robot controller", IEEE, submitted Aug. 5, 2019, [retrieved on Dec. 12, 2025]. Retrieved from the internet <https://ieeexplore.ieee.org/abstract/document/8787385> (Year: 2019).*

* cited by examiner

*Primary Examiner* — Edward Park
*Assistant Examiner* — Alexander Joseph Vaughn
(74) *Attorney, Agent, or Firm* — S.J. INTELLECTUAL PROPERTY LTD.

(57) ABSTRACT

A device includes a memory, configured to store an identifier corresponding to a target; and a processor, configured to send the identifier to one or more first robots; instruct the one or more first robots to search for the target using the identifier; receive a position of the target from a first robot of the one or more first robots; and instruct a second robot to travel to the position.

15 Claims, 4 Drawing Sheets

DYNAMIC TARGET DETECTION AND TRACKING

TECHNICAL FIELD

Various aspects of this disclosure generally relate to the use of robots for dynamic target detection and determination of a position of the target.

BACKGROUND

Within the field of intralogistics, it is known for a robot to operate according to a "follow me" mode, in which the robot is required to follow a target operator, and for the robot to operate according to a "guide me" mode, in which the robot guides the target operator to a specific location. Although some early systems required the operator to carry or wear a device (e.g. a transponder) that identified the operator, it was often generally preferred for the follow me or guide me functions to operate without having to carry or wear such devices. Thus, it became known to perform "follow me" or "guide me" operations using facial recognition, size, body shape, or other personal attributes, wherein the robot tracks the target operator based on a predefined search pattern of these criteria.

Similar to a follow me mode or a guide me mode, it may be desired for a robot to travel to a target operator whose current location is unknown to the robot. This may occur, for example, where a robot is instructed to travel to an operator who is somewhere within a warehouse, but whose exact location is unknown.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
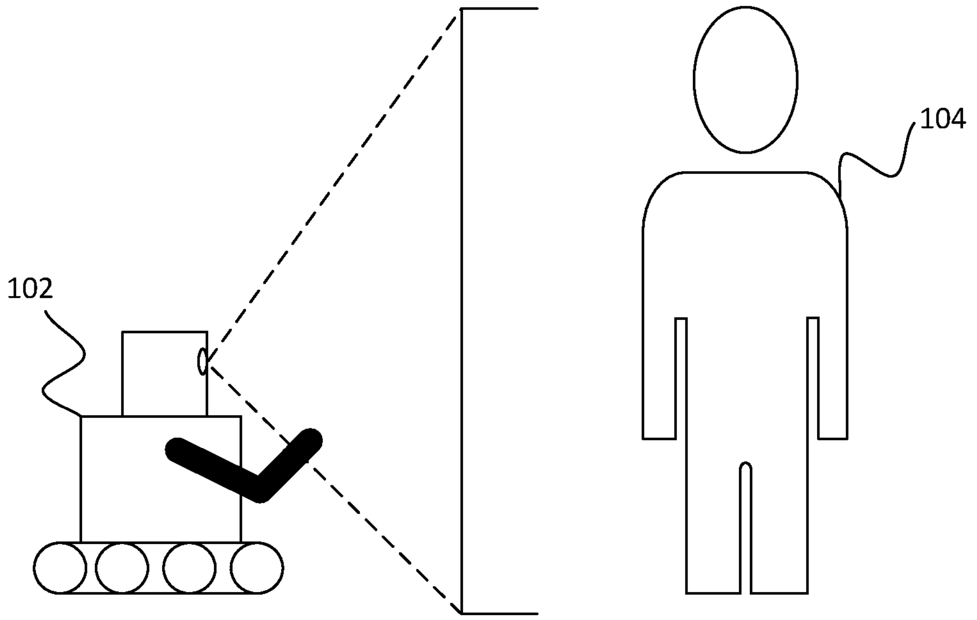
FIG. 1 depicts an onboarding procedure.

The following detailed description refers to the accompanying drawings that show, by way of illustration, exemplary details and embodiments in which aspects of the present disclosure may be practiced.

The word "exemplary" is used herein to mean "serving as an example, instance, or illustration". Any embodiment or design described herein as "exemplary" is not necessarily to be construed as preferred or advantageous over other embodiments or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

Throughout this disclosure, the term "robot" refers to any unmanned, autonomously operating or semi-autonomously operating device. A robot as used herein may be or include a land-based device or an unmanned aerial vehicle (e.g. drone). Nothing about the term "robot" as used herein should be understood as excluding either land-based vehicles or air-based vehicles.

Throughout this disclosure, the word "target" is used to refer to the person or object to which the robot is instructed to travel. In some circumstances, the term "target operator" has been used, which should be understood as being synonymous with a "target". A target may be a human, a non-human animal, or any non-living object. Obviously, to the extent that certain identifiers associated with humans or otherwise with living beings are disclosed (e.g. three-dimensional skeletal movement models, etc.), such identifiers may be more suitable for human or animal targets than for non-living or inanimate targets.

In a dynamic warehouse environment, operators and/or robots may operate dynamically and may thus change locations within the warehouse environment. In certain conditions, it may be necessary or desirable for a robot to seek an operator (e.g., a go to operator command). Assuming that the operator's current location is unknown, however, the robot may be unable to find the operator, or even unable to begin heading in a promising direction to find the operator.

The "follow-me" or "guide me" commands conventionally only work if the operator is continuously in the robot's field of vision. That is, if the robot loses the operator (e.g., the robot cannot identify the operator within the robot's field of vision), then the robot becomes stuck, and the robot typically waits until the operator re-enters the robot's visual range.

The "go to an operator" feature in a dynamic environment, where the operator's location is not known to the robot, can be a challenging problem, and particular where the operator does not remain at a fixed location (e.g. the operator moving may make it more difficult to find the operator). In the following, a Fleet Management System (FMS) is used to divert current available robots from their optimal path to help find the operator's location while the intended robot (e.g. the robot that is supposed to go to the operator) may proceed to the approximate location of the target, if known. The same approach can be utilized with a drone fleet, such as where the fleet helps an actor to find/track his target. In this manner, a robot can go beyond a conventional procedure of requiring a set of coordinates (e.g. a specific location) to travel to and instead can rely other robots to identify the target's location.

Current procedures for deploying a robot typically involve sending the robot to a particular location. In this disclosure, it is described how a robot may instead be sent to a particular person or target, even when the location of said person or target is unknown. To achieve this, other robots in the warehouse may assist in finding and tracking the intended person, optionally while still carrying on with their assigned tasks. Meanwhile, the target is free to move to however the target desires, and the target will still be tracked by the other robots.

The process may generally begin with an onboarding procedure in which one or more identifiers of the target are obtained. An identifier (e.g. an identifier of the target, or a target identifier) may be understood as any characteristic or attribute that can limit a pool of candidate targets. That is, the identifier may be a unique identifier, such as a fingerprint, a facial map, or other such characteristics that may generally be associated with a single person. Alternatively, however, an identifier may be any attribute or characteristic that is associated with fewer than all people (e.g. a body type, a hair color, a person wearing a particular color, etc.). In this manner, the attribute or characteristic may assist the robot in excluding one or more candidate targets.

In one configuration, the identifier may be a facial map or other data set with which the robot may perform a facial recognition procedure. It is generally understood that facial recognition involves an identifier that is either unique to a particular person or at least to a very small number of people. In an industrial setting, facial recognition may be assumed to be a technology that is unique to an individual person. Moreover, robots may be particularly well-suited to perform facial recognition, as most robots in an industrial setting are equipped with one or more image sensors from which the robot may obtain camera data. Alternative sensor configurations may also be used, such as Light Detection and Ranging (LIDAR). Should facial recognition be used in a given implementation, any known methods for performing facial recognition may be used, as nothing about this disclosure should be understood as being limited to any one method or procedure for facial recognition.

Alternatively or additionally, the identifier may include information corresponding to a gait of the target or a known movement pattern of the target's body. Each person's bones are different lengths; these differences, combined with other differences in human musculature, as well as body habit and conditioning, result in a unique (or at least semi-unique) gait or movement pattern that can be detected in sensors data (e.g. in image sensor data, video data, etc.) and matched to a reference gait. In this manner, a target's gait may be detected and stored in an onboarding procedure, and the target can then be subsequently identified by a robot observing the target moving, detecting a gait pattern from the observed movement, and determining whether the detected gait matches the stored gait from the onboarding period. Should gait recognition be used in a given implementation, any known methods for performing gait recognition may be used.

Alternatively or additionally, the identifier may include one or more articles of clothing worn by the target. In this manner, clothing color or pattern, particular articles of clothing, clothing silhouette, or the like may be attributes that the robot can recognize to identify the target. Naturally the robot may detect the target's clothing using image sensors, LIDAR, or any other suitable sensor. For this, a processor of the robot may be configured to identify articles of clothing in an image feed of the robot and to determine whether any article of clothing matches an article of clothing stored as an identifier. Additionally or alternatively, the robot may use one or more artificial neural networks to isolate and identify articles of clothing in an image feed.

Alternatively or additionally, the identifier may include any of body height of the target, body width of the target, a three-dimensional body avatar of the target, or a three-dimensional muscle skeleton model of the target. In this manner, the robot may utilize any, or any combination of, the above elements to identify the target.

It is expressly noted that the above list of potential identifiers is not intended to be limiting. Moreover, any one identifier of the above possible identifiers may be combined with any one or more identifiers, such that the robot locates the target based on a plurality of identifiers. This may be particularly useful, such as when a single identifier, in isolation, may correspond to two or more candidate targets in a vicinity of the robots.

Once the one or more identifiers are collected, they may be stored until a "go to" operation is implemented. In this manner, the one or more identifiers may be stored in the fleet management server and/or locally on the robots of the fleet. For security purposes, it may be preferable to store a facial map centrally (e.g. at the server) and only to transmit it to targeted robots, and only when it is necessary for these targeted robots to search for the target.

FIG. 1 depicts an onboarding procedure, during which one or more identifiers of the target are obtained. A robot 102 may optionally be used to obtain the one or more identifiers of the target 104. The robot 102 may be configured with any of a plurality of sensors, which may be configured to detect information about the target and/or the vicinity of the robot and to generate an electrical signal representing this detected information. In some configurations, it may be desirable to utilize a robot 102 (e.g. a robot within the robot fleet) to obtain the identifiers, as the robot obtaining the identifier may have the same or similar sensors or sensor configuration as a robot eventually locating the target during a deployment. The robot 102 may utilize one or more image sensors (e.g. cameras) and/or one or more other visual sensors (e.g. LIDAR, RADAR, Ultrasound, or any other sensor capable of detecting a visual image of a nearby person). In a first configuration, the robot 102 may be configured to detect one or more identifiers from the sensor data, such as to generate a facial feature map, to identify one or more articles of clothing, to generate a 3D reconstruction of the target's skeleton or the target's gait, or any other detection of an identifier that can be made from sensor data. In a second configuration, the robot 102 may simply transfer (e.g. send, transmit) the sensor data to the fleet management server, and the fleet management server may detect the one or more identifiers from the sensor data. In any event, however the one or more identifiers are detected, they may be stored, such as within the fleet management server, within the robot 102, or otherwise.

In some configurations, it may be unknown or unknowable in advance, which targets will be sought during a given deployment. As such, it may be desirable to scan each moving target in a deployment before the deployment begins. In this manner, each person or other moving target may be scanned and suitable identifiers of said targets may be obtained and stored. In this manner, the corresponding targets may be later identifiable.

Note that the type of identifier may depend upon the type of target. For example, and should the target be a person, desirable identifiers may include, but are not limited to, any of facial characteristics (e.g. facial features, facial map), physical characteristics (e.g., body height, body width, etc.), walking pattern, skeletal pattern, maximum speed (linear, angular, etc.), or the like. However, it is conceivable that a target may be a non-human or non-living object, such as a vehicle (e.g., a car, a forklift, another robot, etc.). For such situations, facial features are obviously unsuitable. Rather, immutable vehicle features, such as vehicle shape, vehicle size, vehicle color, vehicle identification number (e.g., VIN), the vehicle maximum speed (linear, angular), or any other physical characteristic of the vehicle may be preferable.

It is expressly stated that a plurality of identifiers may be utilized to identify a particular target. In this manner, a higher level of specificity may be achieved. For example, whereas a "black vehicle" may hardly be limiting in some environments, a "black vehicle" of a particular height, of a particular width, and of a particular length may greatly reduce the number of candidate targets, or may be sufficient to positively identify a target within a particular configuration. Should a morn unique feature, such as a vehicle identification or perhaps a license plate number, also be taken into consideration, the individual target may be uniquely identifiable.

Once a "go to" command is initiated (e.g. by the Fleet Management Server), it may become necessary for one or more robots of the fleet to begin searching for the target. That is, and assuming that the target's location is unknown, one or more first robots may be required to search the vicinity for the target, and only once the target's location is discovered, can the second robot be instructed to travel to the target (e.g. such as according to the "go to" command).

The Fleet Management Server may instruct the one or more first robots to search for the target according to one of a plurality of operational modes. Three operational modes will now be discussed.

In a first operational mode, which will also be referred to herein as a "passive search" mode, the Fleet Management Server may trigger one or more robots (e.g. one or more robots in the last known target location) to begin actively searching for the target based on the identifier or identifiers. The one or more robots may report to the Fleet Management Server once the target is detected (e.g. once one of the one or more robots discovers the target by detecting the stored identifier). In this first operational more, the robots may perform this search without any change in their assignments or paths.

Of key importance here is the concept of a previously assigned task, which corresponds to the notion of an "assignment" from above. That is, the one or more robots (also referred to herein as the one or more first robots) are likely to have been assigned a task (e.g., a "previously assigned task"), in which the one or more reports were engaged before being instructed to locate the target. For example, the one or more first robots may have been welding, assembling, disassembling, moving objects, cleaning, or any other task. Of course, each of the one or more first robots may have been assigned a different task, or small subsets of the one or more first robots may be engaged in the same or similar previously assigned task.

During the first operational mode, the one or more first robots continue performing their previously assigned task without interruption, while they also attempt to identify the target. This may be achieved, for example, by analyzing image sensor data (or any other sensor data) that is obtained while performing the previously-assigned task. For example, a robot that is welding may have one or more cameras that are turned on, and that occasionally obtain not only image data corresponding to the items being welded, but also to objects in a vicinity of the robot. The robot may continue to perform its assigned task while assessing its sensor data for any identifier that may be indicative of the target. This may be understood as the passive search mode.

In the second operational mode (which may be understood as a semi-active search mode), the robot may temporarily interrupt its previously assigned task to search for the target. In this manner, the Fleet Management Server may optionally select a duration during which one or more first robots may shift from their previously assigned task to actively help locating the target. In this second operational mode, the one or more first robots may slightly deviate from their original assignment (e.g. from their previously assigned task, from an area or location associated with the previously assigned task), such as based on the robot's proximity to an where the target was last detected or suspected to be detected (e.g. if an agent—same or different one, detected the class of the required object in that space). That path deviation for the agents may be updated based on their assignment priorities and their proximity to the relevant area. That the second operational mode may be time-limited, so that, if no results are achieved within a predetermined time, the Fleet Management Server will move to the last phase—active search.

In the third operational mode, which is an active search mode, the fleet management server may instruct one or more robots to discontinue their previously assigned task and to dedicate their full attention/resources to searching for the target. This may be distinguishable from the second operational mode in that the third operational mode may be without temporal limitation (e.g., the robots are not merely authorized to deviate from the previously assigned task for a predetermined duration, but rather for an undetermined duration or to jettison the previously assigned task altogether), and without geographic limitation (e.g., the robots may engage in a search for the target any distance from an area corresponding to the previously assigned task, rather than within a predetermined distance from an area corresponding to the previously assigned task).

Figure 2:
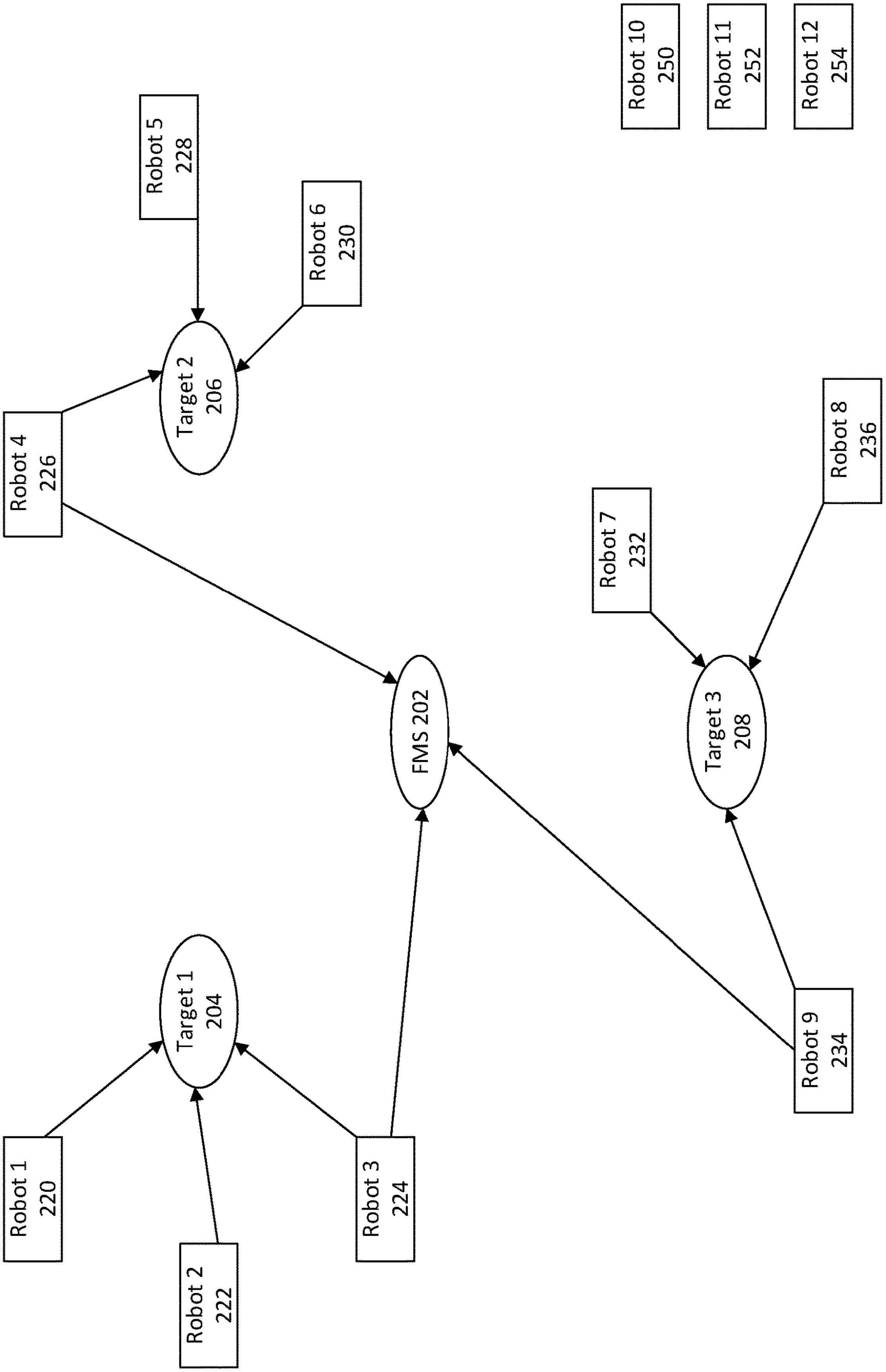
FIG. 2 depicts a plurality of first robots.

FIG. 2 depicts a plurality of first robots (e.g. the searching robots) attempting to detect a target. In this figure, the Fleet Management Server (e.g. the Server) 202 sends a command to one or more first robots (220 through 236) to begin a search for a target. This command may include an operational mode as described above. The instruction may include a communication or one or more identifiers of the target, which may then be used by the one or more first robots 220-236. Alternatively, the Fleet Management Server 202 may send the possible identifiers to the one or more first robots in advance of the search (e.g. the database or list of identifies is locally stored in the robots), and the Fleet Management Server 202 may merely instruct the robots which identifiers to search for (e.g., a person with facial features as stored in a particular address, a person with a yellow coat, a person having a gait matching a particular gait analysis, etc.).

Each of the first robots 220-236 attempts to locate the target. In this hypothetical scenario, Robot 3 224 is the first robot to identify Target 1 204 using an identifier; robot 4 226 is the first robot to identify Target 2 206 using an identifier; and robot 9 234 is the first robot to identify Target 3 208 using an identifier. Robot 3 224 reports the position of Target 1 204 to the Fleet Management Server 202; Robot 4 226 reports the position of Target 2 206 to the Fleet Management Server 202; and Robot 9 234 reports the position of Target 3 208 to the Fleet Management Server 202. In this manner, the Fleet Management Server 202 becomes aware of the positions of Target 1 204, Target 206, and Target 3, and it may update a central map accordingly. The Fleet Management Server 202 may then instruct a second robot (in this case, Robot 10 250) to go to Target 1 204 at the newly-identified location; instruct a second robot (in this case Robot 11 252) to go to Target 2 206 at the newly identified location; and instruct a second robot (in this case Robot 12 254) to go to Target 3 208 at the newly identified location. Until the second robots arrive at their corresponding Target, any of the first robots (Robots 1-9 220-234) may follow the respective target and periodically report the target's position to the Fleet Management Server 202, which may correspondingly update the position with the corresponding second robot.

The Fleet Management Server may proceed through the various operational modes if insufficient results are achieved in a previous mode. That is, the Fleet Management Server may instruct the robots to engage in the second operational mode if the target is not identified after a predetermined duration in the first operational mode; and the Fleet Management Server may instruct the robots to engage in the third operational mode if the target is not identified after a predetermined duration in the second operational mode. The Fleet Management Server may assign one or more first robots the task of searching for the target. This assignment may optionally include a path to take or an area in which the search should be conducted.

Figure 3:
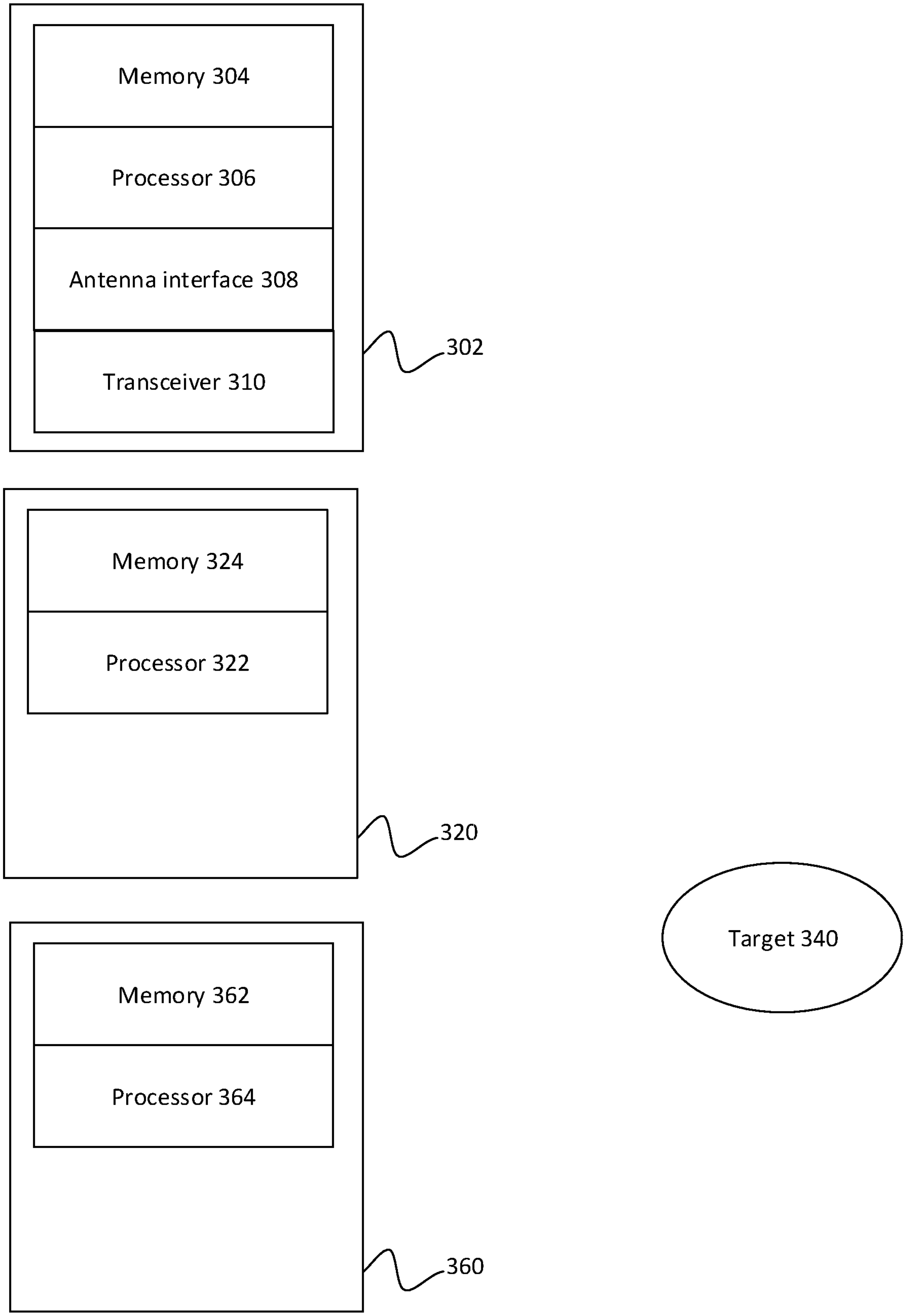
FIG. 3 depicts a system.

FIG. 3 depicts a system including a Fleet Management Server 302, a first robot 320, a target 340, and a second robot 360. The Fleet Management Server 302 may include a memory 304, which may be configured to store an identifier corresponding to a target 340. The Fleet Management Server 302 may further include a processor 306, which may be configured to send the identifier to one or more first robots 320. The processor 306 may be configured to instruct the one or more first robots 320 to search for the target 340 using the identifier; receive a position of the target 340 from a first robot 320 of the one or more first robots; and instruct a second robot 360 to travel to the position. In this manner, instructing the one or more first robots 320 to search for the target 340 may include instructing the one or more first robots 320 to search for the target 340 according to one of a plurality of operational modes. The plurality of operational modes may include a first operational mode and a second operational mode; wherein the first operational mode includes the one or more first robots 320 searching for the target 340 while continuing to perform a previously assigned task, and the second operational mode may include the one or more first robots 320 searching for the target 340 during a period in which the previously assigned task is temporarily interrupted. In this manner, temporarily interrupting the previously assigned task may include discontinuing the previously assigned task for a predetermined duration or discontinuing the previously assigned task to perform a search within a predetermined distance from a location corresponding to the previously assigned task.

The plurality of operational modes may further include a third operational mode, wherein the third operational mode includes the plurality of first robots discontinuing the pre-assigned task until the target is located. The second operational mode and/or the third operational mode may optionally include the one or more first robots 320 performing a grid search for the target 340. The second operational mode and/or the third operational mode may include the one or more first robots 320 traveling to an expected location of the target 340 and searching outwards from the expected location. The memory may be further configured to store a priority variable representing a priority level of locating the target 340. The processor may be configured to select the operational mode of the plurality of operational modes based on the priority variable.

The identifier may optionally include an image of the face of the target 340 or information corresponding to one or more features of the face of the target 340. The identifier may optionally include information corresponding to a gait of the target or a known movement pattern of the body of the target 340. The identifier may include information corresponding to one or more articles of clothing worn by the target 340. The identifier may optionally include any of body height of the target, body width of the target, a three-dimensional body avatar of the target, or a three-dimensional muscle skeleton model of the target 340.

The 306 processor may be configured to send the identifier to the one or more first robots 320 and to instruct the one or more first robots 320 to search for the target 340 corresponding to the identifier in response to a transmission from the second robot 360 that target cannot be located. The memory 304 may be is further configured to store an expected location of the target 340; wherein the processor 306 is further configured to send the expected location of the target 340 to the one or more first robots 320; and wherein the processor 306 instructing the one or more first robots 320 to search for the target 340 includes the processor 306 instructing the one or more first robots 320 to begin the search at the expected location.

A map of a vicinity of the target 340 may be stored in the memory 304, and the processor 306 may be further configured to update a location of the target 340 in the map based on the position. The device may further include an antenna interface 308, wherein the sending or the instructing includes the processor 306 causing a transceiver 310 to send a message over the antenna interface 308.

A first robot 320 may include a processor 322, which may be configured to receive an identifier of a target 340; search for the target 340 based on the identifier; determine a position of the target 340 when the target is identified; and send a message including the position of the target 340. The first robot 320 may include a memory 324. The processor 322 may be configured to store the position of the target 340 in a memory 324. The first robot 320 may be configured to search for the target 340 according to one of a plurality of operational modes. The plurality of operational modes may include a first operational mode and a second operational mode; wherein the first operational mode includes the first robot 320 searching for the target 340 while continuing to perform a previously assigned task; wherein the second operational mode includes the first robot 320 searching for the target 340 during a period in which the previously assigned task is temporarily interrupted. Temporarily interrupting the previously assigned task may include the first robot 320 discontinuing the previously assigned task for a predetermined duration or discontinuing the previously assigned task to perform a search within a predetermined distance from a location corresponding to the previously assigned task.

The plurality of operational modes may further include a third operational mode; wherein the third operational mode includes the first robot 320 discontinuing the preassigned task until the target 340 is located. The second operational mode and/or the third operational mode may include the robot 320 performing a grid search for the target. The second operational mode and/or the third operational mode may include the first robot traveling to an expected location of the target and searching outwards from the expected location.

The first robot 320 may be configured to search for the identifier in image sensor data or LIDAR data. The memory 324 may be further configured to store an expected location of the target 340; wherein the first robot 320 is configured to begin the search at the expected location. Once the target 340 is identified, the first robot 320 may be configured to follow the target 340 until a second robot 360 arrives. The second robot 360 may include any of the features of the first robot, including, but not limited to, a memory 362 and a processor 364.

Figure 4:
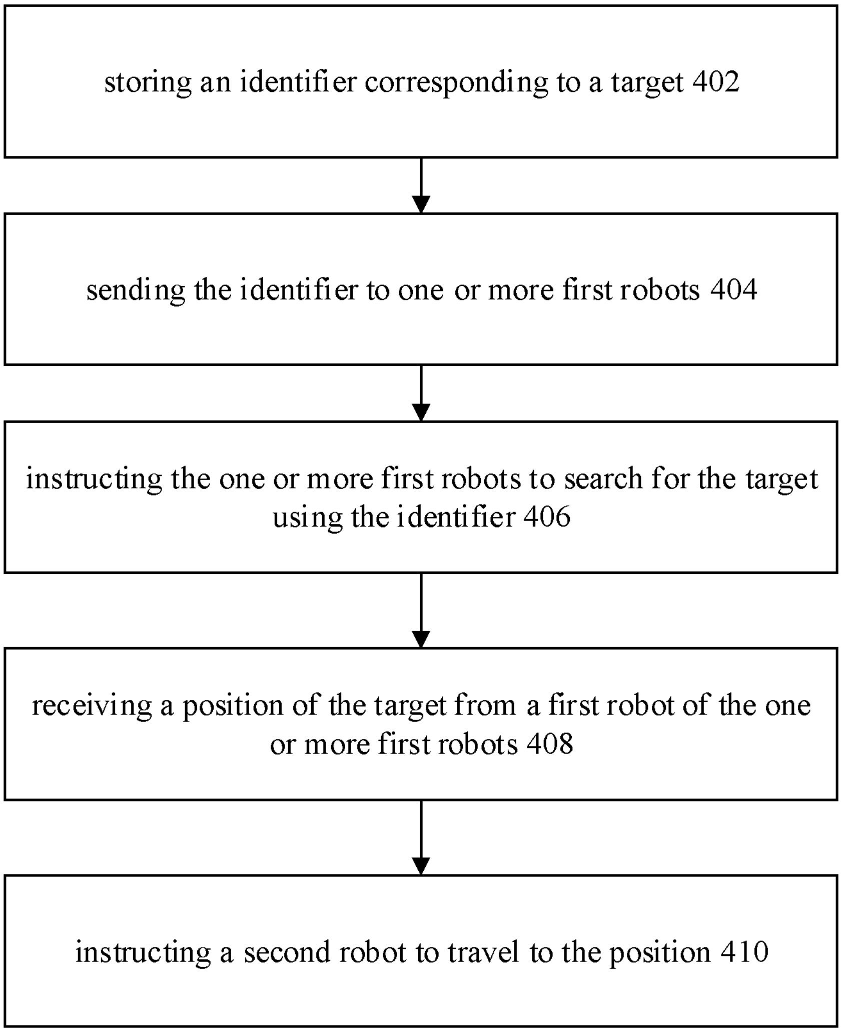
FIG. 4 depicts a method.

FIG. 4 depicts a method including storing an identifier corresponding to a target 402; sending the identifier to one or more first robots 404; instructing the one or more first robots to search for the target using the identifier 406; receiving a position of the target from a first robot of the one or more first robots 408; and instructing a second robot to travel to the position 410.

It is worth noting that greater search effectiveness may be obtained with the third operational mode compared to the second operational mode, and with the second operational mode compared to the first operational mode. This may be because the third operational mode allows for unlimited (or at least comparatively unlimited) search area, which permits the robots to be in close proximity to the target. In contrast, the robots' proximity to the target in the second operational mode may be somewhat more limited, as the search area may be constrained. Should the target not be within the constrained search area, then it may occur that the robot may not be in close proximity to the target. Since the search area in the first operational mode is quite constrained (e.g. limited to an area where the previously assigned task is being performed), it may occur that the target can only be searched from a distance.

Of course, some identifiers can be detected from a distance, such as body height, body width, articles of clothing, certain aspects of gait, and the like. However, other identifiers, for example facial features, may require comparatively close proximity to the target to effectively detect.

Owning to an instruction from the Fleet Management Server, or merely as part of the second operational mode or the third operational mode, the robots may optionally engage in a coordinated search pattern. For example, the robots may search within a grid pattern. Alternatively or additionally, the Fleet Management Server may deem one or more areas as being areas of an increased probability for the target to be located, and the robots may concentrate or even exclusively perform their searches in the one or more areas.

Upon detecting the target's location, the robot (e.g. the robot that detected the target) may share this location with the Fleet Management Server, and the Fleet Management Server may update this location within the Fleet Management Server's central map. The Fleet Management Server may then send this location to the second robot (e.g. the robot that is supposed to go to the target), which will then travel to the location in search of the target.

In an optional configuration, once one or more first robots identify the target, at least one of the one or more first robots may stay with the target until the second robot arrives. In this manner, the target remains free to move throughout the environment until the second robot arrives. Should the target change location, the at least one of the one or more first robots will continue to follow the target and will periodically send the target's updated location to the Fleet Management Server.

Additional aspects of the disclosure will be described by way of Example:

In Example 1, a device, including a memory, configured to store an identifier corresponding to a target; a processor, configured to: send the identifier to one or more first robots; instruct the one or more first robots to search for the target using the identifier; receive a position of the target from a first robot of the one or more first robots; and instruct a second robot to travel to the position.

In Example 2, the device of Example 1, wherein instructing the one or more first robots to search for the target includes instructing the one or more first robots to search for the target according to one of a plurality of operational modes.

In Example 3, the device of Example 2, wherein the plurality of operational modes includes a first operational mode and a second operational mode; wherein the first operational mode includes the one or more first robots searching for the target while continuing to perform a previously assigned task; wherein the second operational mode includes the one or more first robots searching for the target during a period in which the previously assigned task is temporarily interrupted.

In Example 4, the device of Example 3, wherein temporarily interrupting the previously assigned task includes discontinuing the previously assigned task for a predetermined duration or discontinuing the previously assigned task to perform a search within a predetermined distance from a location corresponding to the previously assigned task.

In Example 5, the device of any one of Examples 3 to 4, wherein the plurality of operational modes further includes a third operational mode; wherein the third operational mode includes the plurality of first robots discontinuing the preassigned task until the target is located.

In Example 6, the device of any one of Examples 4 to 5, wherein the second operational mode and/or the third operational mode include the one or more first robots performing a grid search for the target.

In Example 7, the device of any one of Examples 4 to 5, wherein the second operational mode and/or the third operational mode include the one or more first robots traveling to an expected location of the target and searching outwards from the expected location.

In Example 8, the device of any one of Examples 2 to 7, wherein the memory is further configured to store a priority variable representing a priority level of locating the target, and wherein the processor is configured to select the operational mode of the plurality of operational modes based on the priority variable.

In Example 9, the device of any one of Examples 1 to 8, wherein the identifier includes an image of the target's face or information corresponding to one or more features of the target's face.

In Example 10, the device of any one of Examples 1 to 9, wherein the identifier includes information corresponding to a gait of the target or a known movement pattern of the target's body.

In Example 11, the device of any one of Examples 1 to 10, wherein the identifier includes information corresponding to one or more articles of clothing worn by the target.

In Example 12, the device of any one of Examples 1 to 11, wherein the identifier includes any of body height of the target, body width of the target, a three-dimensional body avatar of the target, or a three-dimensional muscle skeleton model of the target.

In Example 13, the device of any one of Examples 1 to 12, wherein the processor is configured to send the identifier to the one or more first robots and to instruct the one or more first robots to search for the target corresponding to the identifier in response to a transmission from the second robot that target cannot be located.

In Example 14, the device of any one of Examples 1 to 13, wherein the memory is further configured to store an expected location of the target; wherein the processor is further configured to send the expected location of the target to the one or more first robots; and wherein the processor instructing the one or more first robots to search for the target includes the processor instructing the one or more first robots to begin the search at the expected location.

In Example 15, the device of any one of Examples 1 to 14, further including a map a vicinity of the target; wherein the processor is further configured to update a location of the target in the map based on the position.

In Example 16, the device of any one of Examples 1 to 15, further including an antenna interface, wherein the sending or the instructing includes the processor causing a transceiver to send a message over the antenna interface.

In Example 17, a robot, including: a processor, configured to receive an identifier of a target; search for the target based on the identifier; determine a position of the target when the target is identified; and send a message including the position of the target; a memory, wherein the processor is configured to store the position of the target.

In Example 18, the robot of Example 17, wherein the robot is configured to search for the target according to one of a plurality of operational modes.

In Example 19, the robot of Example 18, wherein the plurality of operational modes includes a first operational mode and a second operational mode; wherein the first operational mode includes the robot searching for the target while continuing to perform a previously assigned task; wherein the second operational mode includes the robot searching for the target during a period in which the previously assigned task is temporarily interrupted.

In Example 20, the robot of Example 19, wherein temporarily interrupting the previously assigned task includes the robot discontinuing the previously assigned task for a predetermined duration or discontinuing the previously assigned task to perform a search within a predetermined distance from a location corresponding to the previously assigned task.

In Example 21, the robot of any one of Examples 19 to 20, wherein the plurality of operational modes further includes a third operational mode; wherein the third operational mode includes the robot discontinuing the preassigned task until the target is located.

In Example 22, the robot of any one of Examples 20 to 21, wherein the second operational mode and/or the third operational mode include the robot performing a grid search for the target.

In Example 23, the robot of any one of Examples 20 to 21, wherein the second operational mode and/or the third operational mode include the robot traveling to an expected location of the target and searching outwards from the expected location.

In Example 24, the robot of any one of Examples 17 to 23, wherein the identifier includes an image of the target's face or information corresponding to one or more features of the target's face.

In Example 25, the robot of any one of Examples 17 to 24, wherein the identifier includes information corresponding to a gait of the target or a known movement pattern of the target's body.

In Example 26, the robot of any one of Examples 17 to 25, wherein the identifier includes information corresponding to one or more articles of clothing worn by the target.

In Example 27, the robot of any one of Examples 17 to 26, wherein the robot is configured to search for the identifier in image sensor data or LIDAR data.

In Example 28, the robot of any one of Examples 17 to 27, wherein the memory is further configured to store an expected location of the target; wherein the robot is configured to begin the search at the expected location.

In Example 29, the robot of any one of Examples 17 to 28, wherein once the target is identified, the robot is configured to follow the target until a second robot arrives.

In Example 30, a non-transitory computer readable medium, including instructions which, if executed, cause one or more processors to: send an identifier of a target to one or more first robots; instruct the one or more first robots to search for the target using the identifier; receive a position of the target from a first robot of the one or more first robots; and instruct a second robot to travel to the position.

In Example 31, the non-transitory computer readable medium of Example 30, wherein the instructing the one or more first robots to search for the target includes instructing the one or more first robots to search for the target according to one of a plurality of operational modes.

In Example 32, the non-transitory computer readable medium of Example 31, wherein the plurality of operational modes includes a first operational mode and a second operational mode; wherein the first operational mode includes the one or more first robots searching for the target while continuing to perform a previously assigned task; wherein the second operational mode includes the one or more first robots searching for the target during a period in which the previously assigned task is temporarily interrupted.

In Example 33, the non-transitory computer readable medium of Example 32, wherein temporarily interrupting the previously assigned task includes discontinuing the previously assigned task for a predetermined duration or discontinuing the previously assigned task to perform a search within a predetermined distance from a location corresponding to the previously assigned task.

In Example 34, the non-transitory computer readable medium of any one of Examples 32 to 33, wherein the plurality of operational modes further includes a third operational mode; wherein the third operational mode includes the plurality of first robots discontinuing the preassigned task until the target is located.

In Example 35, the non-transitory computer readable medium of any one of Examples 33 to 34, wherein the second operational mode and/or the third operational mode include the one or more first robots performing a grid search for the target.

In Example 36, the non-transitory computer readable medium of any one of Examples 33 to 34, wherein the second operational mode and/or the third operational mode include the one or more first robots traveling to an expected location of the target and searching outwards from the expected location.

In Example 37, the non-transitory computer readable medium of any one of Examples 31 to 36, wherein the memory is further configured to store a priority variable representing a priority level of locating the target, and wherein the processor is configured to select the operational mode of the plurality of operational modes based on the priority variable.

In Example 38, the non-transitory computer readable medium of any one of Examples 30 to 37, wherein the identifier includes an image of the target's face or information corresponding to one or more features of the target's face.

In Example 39, the non-transitory computer readable medium of any one of Examples 30 to 38, wherein the identifier includes information corresponding to a gait of the target or a known movement pattern of the target's body.

In Example 40, the non-transitory computer readable medium of any one of Examples 30 to 39, wherein the identifier includes information corresponding to one or more articles of clothing worn by the target.

In Example 41, the non-transitory computer readable medium of any one of Examples 30 to 40, wherein the identifier includes any of body height of the target, body width of the target, a three-dimensional body avatar of the target, or a three-dimensional muscle skeleton model of the target.

In Example 42, the non-transitory computer readable medium of any one of Examples 30 to 41, wherein the instructions are further configured to cause the processor to send the identifier to the one or more first robots and to instruct the one or more first robots to search for the target corresponding to the identifier in response to a transmission from the second robot that target cannot be located.

In Example 43, the non-transitory computer readable medium of any one of Examples 30 to 42, wherein the memory is further configured to store an expected location of the target; wherein the instructions are further configured to cause the processor to send the expected location of the target to the one or more first robots; and wherein the instructions causing the processor to instruct the one or more first robots to search for the target includes the instructions causing the processor to instruct the one or more first robots to begin the search at the expected location.

In Example 44, the non-transitory computer readable medium of any one of Examples 30 to 43, further including a map a vicinity of the target; wherein the instructions are further configured to cause the processor to update a location of the target in the map based on the position.

In Example 45, the non-transitory computer readable medium of any one of Examples 30 to 44, further including an antenna interface, wherein the sending or the instructing includes the instructions causing the processor to cause a transceiver to send a message over the antenna interface.

In Example 46, a non-transitory computer readable medium, including instructions which, if executed by a processor, cause the processor to: receive an identifier of a target;

search for the target based on the identifier; determine a position of the target when the target is identified; and send a message including the position of the target;

In Example 47, the non-transitory computer readable medium of Example 46, wherein the instructions are configured to cause the processor to search for the target according to one of a plurality of operational modes.

In Example 48, the non-transitory computer readable medium of Example 47, wherein the plurality of operational modes includes a first operational mode and a second operational mode; wherein the first operational mode includes the processor searching for the target while continuing to perform a previously assigned task; wherein the second operational mode includes the processor searching for the target during a period in which the previously assigned task is temporarily interrupted.

In Example 49, the non-transitory computer readable medium of Example 48, wherein temporarily interrupting the previously assigned task includes the processor discontinuing the previously assigned task for a predetermined duration or discontinuing the previously assigned task to perform a search within a predetermined distance from a location corresponding to the previously assigned task.

In Example 50, the non-transitory computer readable medium of any one of Examples 48 to 49, wherein the plurality of operational modes further includes a third operational mode; wherein the third operational mode includes the robot discontinuing the preassigned task until the target is located.

In Example 51, the non-transitory computer readable medium of any one of Examples 49 to 50, wherein the second operational mode and/or the third operational mode include the processor performing a grid search for the target.

In Example 52, the non-transitory computer readable medium of any one of Examples 49 to 50, wherein the second operational mode and/or the third operational mode include the processor causing a robot traveling to an expected location of the target and to search outwards from the expected location.

In Example 53, the non-transitory computer readable medium of any one of Examples 46 to 52, wherein the identifier includes an image of the target's face or information corresponding to one or more features of the target's face.

In Example 54, the non-transitory computer readable medium of any one of Examples 46 to 53, wherein the identifier includes information corresponding to a gait of the target or a known movement pattern of the target's body.

In Example 55, the non-transitory computer readable medium of any one of Examples 46 to 54, wherein the identifier includes information corresponding to one or more articles of clothing worn by the target.

In Example 56, the non-transitory computer readable medium of any one of Examples 46 to 55, wherein the instructions are further configured to cause the processor to search for the identifier in image sensor data or LIDAR data.

In Example 57, the non-transitory computer readable medium of any one of Examples 46 to 56, wherein once the target is identified, the instructions are further configured to cause a first robot to follow the target until a second robot arrives.

In Example 58, a method, including storing an identifier corresponding to a target; sending the identifier to one or more first robots; instructing the one or more first robots to search for the target using the identifier; receiving a position of the target from a first robot of the one or more first robots; and instructing a second robot to travel to the position.

In Example 59, the method of Example 58, wherein instructing the one or more first robots to search for the target includes instructing the one or more first robots to search for the target according to one of a plurality of operational modes.

In Example 60, the method of Example 59, wherein the plurality of operational modes includes a first operational mode and a second operational mode; wherein the first operational mode includes the one or more first robots searching for the target while continuing to perform a previously assigned task; wherein the second operational mode includes the one or more first robots searching for the target during a period in which the previously assigned task is temporarily interrupted.

In Example 61, the method of Example 60, wherein temporarily interrupting the previously assigned task includes discontinuing the previously assigned task for a predetermined duration or discontinuing the previously assigned task to perform a search within a predetermined distance from a location corresponding to the previously assigned task.

In Example 62, the method of any one of Examples 60 to 61, wherein the plurality of operational modes further includes a third operational mode; wherein the third operational mode includes the plurality of first robots discontinuing the preassigned task until the target is located.

In Example 63, the method of any one of Examples 61 to 62, wherein the second operational mode and/or the third operational mode include the one or more first robots performing a grid search for the target.

In Example 64, the method of any one of Examples 61 to 62, wherein the second operational mode and/or the third operational mode include the one or more first robots traveling to an expected location of the target and searching outwards from the expected location.

In Example 65, the method of any one of Examples 59 to 64, wherein the memory is further configured to store a priority variable representing a priority level of locating the target, and wherein the processor is configured to select the operational mode of the plurality of operational modes based on the priority variable.

In Example 66, the method of any one of Examples 58 to 65, wherein the identifier includes an image of the target's face or information corresponding to one or more features of the target's face.

In Example 67, the method of any one of Examples 58 to 66, wherein the identifier includes information corresponding to a gait of the target or a known movement pattern of the target's body.

In Example 68, the method of any one of Examples 58 to 67, wherein the identifier includes information corresponding to one or more articles of clothing worn by the target.

In Example 69, the method of any one of Examples 58 to 68, wherein the identifier includes any of body height of the target, body width of the target, a three-dimensional body avatar of the target, or a three-dimensional muscle skeleton model of the target.

In Example 70, the method of any one of Examples 58 to 69, wherein the processor is configured to send the identifier to the one or more first robots and to instruct the one or more first robots to search for the target corresponding to the identifier in response to a transmission from the second robot that target cannot be located.

In Example 71, the method of any one of Examples 58 to 70, wherein the memory is further configured to store an expected location of the target; wherein the processor is further configured to send the expected location of the target to the one or more first robots; and wherein the processor instructing the one or more first robots to search for the target includes the processor instructing the one or more first robots to begin the search at the expected location.

In Example 72, the method of any one of Examples 58 to 71, further including a map a vicinity of the target; wherein the processor is further configured to update a location of the target in the map based on the position.

In Example 73, the method of any one of Examples 58 to 72, further including an antenna interface, wherein the sending or the instructing includes the processor causing a transceiver to send a message over the antenna interface.

In Example 74, a method of locating a target with a robot, including: receiving an identifier of a target; searching for the target based on the identifier; determining a position of the target when the target is identified; and sending a message including the position of the target.

In Example 75, the method of Example 74, further including searching for the target according to one of a plurality of operational modes.

In Example 76, the method of Example 75, wherein the plurality of operational modes includes a first operational mode and a second operational mode; wherein the first operational mode includes the robot searching for the target while continuing to perform a previously assigned task; wherein the second operational mode includes the robot searching for the target during a period in which the previously assigned task is temporarily interrupted.

In Example 77, the method of Example 76, wherein temporarily interrupting the previously assigned task includes the robot discontinuing the previously assigned task for a predetermined duration or discontinuing the previously assigned task to perform a search within a predetermined distance from a location corresponding to the previously assigned task.

In Example 78, the method of any one of Examples 76 to 77, wherein the plurality of operational modes further includes a third operational mode; wherein the third operational mode includes the robot discontinuing the preassigned task until the target is located.

In Example 79, the method of any one of Examples 77 to 78, wherein the second operational mode and/or the third operational mode include the robot performing a grid search for the target.

In Example 80, the method of any one of Examples 77 to 78, wherein the second operational mode and/or the third operational mode include the robot traveling to an expected location of the target and searching outwards from the expected location.

In Example 81, the method of any one of Examples 74 to 80, wherein the identifier includes an image of the target's face or information corresponding to one or more features of the target's face.

In Example 82, the method of any one of Examples 74 to 81, wherein the identifier includes information corresponding to a gait of the target or a known movement pattern of the target'body.

In Example 83, the method of any one of Examples 74 to 82, wherein the identifier includes information corresponding to one or more articles of clothing worn by the target.

In Example 84, the method of any one of Examples 74 to 83, further including the robot searching for the identifier using image sensor data or LIDAR data.

In Example 85, the method of any one of Examples 74 to 84, further including the robot beginning the search at an expected location stored in a memory.

In Example 86, the method of any one of Examples 74 to 85, further including following the target, once the target is identified, until a second robot arrives.

While the above descriptions and connected figures may depict components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all Examples included herein.

What is claimed is:

1. A device, comprising:

a memory, configured to store an identifier corresponding to a target;

a processor, configured to:

send the identifier to one or more first robots;

instruct the one or more first robots to search for the target using the identifier;

receive a position of the target from a first robot of the one or more first robots; and instruct a second robot to travel to the position;

wherein instructing the one or more first robots to search for the target comprises instructing the one or more first robots to search for the target according to one of a plurality of operational modes including at least a first operational mode and a second operational mode;

wherein, in the first operational mode, the one or more first robots search for the target while continuing to perform a previously assigned task;

wherein, in the second operational mode, the one or more first robots temporarily interrupt the previously assigned task and search for the target during the interruption by performing a grid sea for the target.

2. The device of claim 1, wherein temporarily interrupting the previously assigned task comprises discontinuing the previously assigned task for a predetermined duration or discontinuing the previously assigned task to perform said grind search within a predetermined distance from a location corresponding to the previously assigned task.

3. The device of claim 1, wherein the plurality of operational modes further comprises a third operational mode; and wherein the third operational mode comprises the one or more first robots discontinuing the previously assigned task until the target is located.

4. The device of claim 3, wherein the second operational mode and/or the third operational mode comprise the one or more first robots traveling to an expected location of the target and searching outwards from the expected location.

5. The device of claim 4, wherein the memory is further configured to store a priority variable representing a priority level of locating the target, and wherein the processor is configured to select an operational mode of the plurality of operational modes based on the priority variable.

6. The device of claim 1, wherein the identifier comprises an image of a face of the target or information corresponding to one or more features of the face of the target.

7. The device of claim 1, wherein the identifier comprises information corresponding to a gait of the target or a known movement pattern of a body of the target.

8. The device of claim 1, wherein the identifier comprises information corresponding to one or more articles of clothing worn by the target.

9. The device of claim 1, wherein the identifier comprises any of body height of the target, body width of the target, a three-dimensional body avatar of the target, or a three-dimensional muscle skeleton model of the target.

10. The device of claim 1, wherein the processor is configured to send the identifier to the one or more first robots and to instruct the one or more first robots to search for the target corresponding to the identifier in response to a transmission from the second robot that target cannot be located.

11. The device of claim 1, wherein the memory is further configured to store an expected location of the target; wherein the processor is further configured to send the expected location of the target to the one or more first robots; and wherein the processor instructing the one or more first robots to search for the target comprises the processor instructing the one or more first robots to begin the search at the expected location.

12. The device of claim 1, further comprising a map a vicinity of the target; and wherein the processor is further configured to update a location of the target in the map based on the position.

13. The device of claim 1, further comprising an antenna interface, wherein the sending or the instructing comprises the processor causing a transceiver to send a message over the antenna interface.

14. A robot, comprising:

a processor, configured to:

receive an identifier of a target;

search for the target based on the identifier;

determine a position of the target when the target is identified; and send a message comprising the position of the target; and a memory, wherein the processor is configured to store the position of the target;

wherein instructing the robot to search for the target comprises instructing the robot to search for the target according to one of a plurality of operational modes including at least a first operational mode and a second operational mode;

wherein, in the first operational mode, the robot searches for the target while continuing to perform a previously assigned task;

wherein, in the second operational mode, the robot temporarily interrupts the previously assigned task and search for the target during the interruption by performing a grid search for the target.

15. A non-transitory computer readable medium, comprising instructions which, if executed, cause one or more processors to:

send an identifier of a target to one or more first robots;

instruct the one or more first robots to search for the target using the identifier;

receive a position of the target from a first robot of the one or more first robots; and instruct a second robot to travel to the position;

wherein instructing the robot to search for the target comprises instructing the robot to search for the target according to one of a plurality of operational modes including at least a first operational mode and a second operational mode;

wherein, in the first operational mode, the robot searches for the target while continuing to perform a previously assigned task;

wherein, in the second operational mode, the robot temporarily interrupts the previously assigned task and search for the target during the interruptions by performing a grid search for the target.

* * * * *